(12) United States Patent
Murai et al.

(10) Patent No.: US 6,411,038 B2
(45) Date of Patent: Jun. 25, 2002

(54) INSTALLATION STRUCTURE OF ENGINE COMPONENT WITH COMBUSTION PRESSURE SENSOR IN ENGINE

(75) Inventors: Hiroyuki Murai, Anjo; Kouichi Hattori, Ichinomiya, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/742,001

(22) Filed: Dec. 22, 2000

(30) Foreign Application Priority Data

Dec. 24, 1999  (JP) ........................................... 11-366456

(51) Int. Cl.⁷ ................................................. H01J 7/44
(52) U.S. Cl. ........................ 315/55; 313/118; 313/126; 123/435
(58) Field of Search ........................... 315/55; 313/118, 313/126, 135, 137, 139, 141, 144; 123/406.26, 406.41, 435, 657, 406, 49

(56) References Cited

U.S. PATENT DOCUMENTS 4,382,377 A * 5/1983 Kleinschmidt et al. ......... 73/35
4,392,082 A    7/1983 Harada ......................... 315/55
5,313,849 A * 5/1994 Miyata et al. ............. 73/866.5
6,138,654 A * 10/2000 Pretorius et al. ............... 315/55

FOREIGN PATENT DOCUMENTS

EP          0 834 699         4/1998
JP          6-265431          9/1994

* cited by examiner

Primary Examiner—Don Wong
Assistant Examiner—Thuy Vinh Tran
(74) Attorney, Agent, or Firm—Nixon & Vanderhye PC

(57) ABSTRACT

In an installation structure of a glow plug with a combustion pressure sensor, a seat surface is provided in an installation hole formed in the engine so as to penetrate from outside into a combustion chamber of the engine. A contact surface is formed in the glow plug. The glow plug is partly inserted into the installation hole and is fixed via a ring shaped gasket to the engine so that the glow plug comes in pressurized contact with the engine in an axial direction of the installation hole. With the installation structure mentioned above, the elastic member is elastically more deformable in an axial direction of the installation hole than a portion of the glow plug on which the combustion pressure sensor is mounted.

12 Claims, 12 Drawing Sheets

FIG. 6A
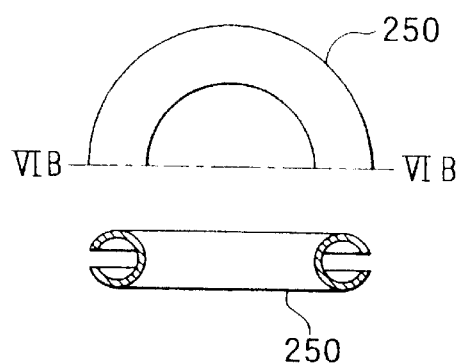
FIG. 6B
FIG. 6C
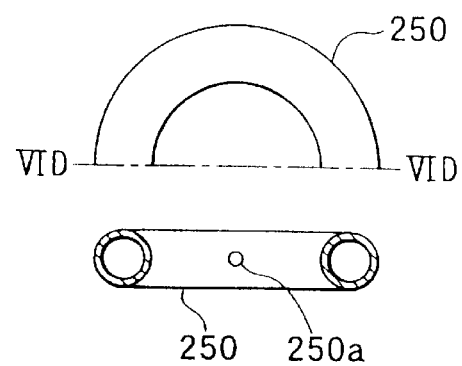
FIG. 6D
FIG. 6E
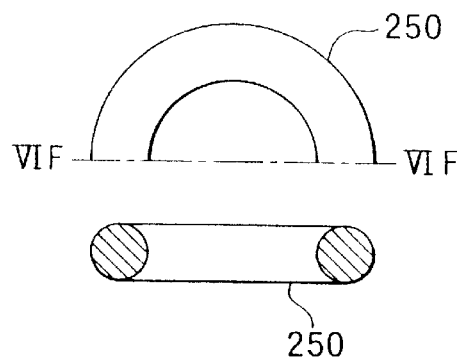
FIG. 6F
FIG. 6G
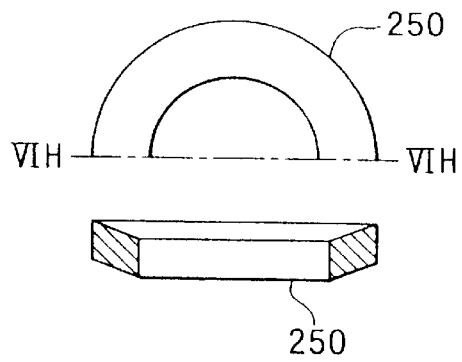
FIG. 6H

INSTALLATION STRUCTURE OF ENGINE COMPONENT WITH COMBUSTION PRESSURE SENSOR IN ENGINE

CROSS REFERENCE TO RELATED APPLICATION

This application is based upon and claims the benefit of priority of Japanese Patent Application No. H.11-366456 filed on Dec. 24, 1999, the content of which is incorporated herein by reference.

BACKGROUND OF THE INVENTION

1. Field of the Invention

The present invention relates to an installation structure of an engine component (for example, a glow plug, a spark plug, injector and a volt) with a combustion pressure sensor in an engine in which the engine component is inserted into an installation hole of the engine and fixed to the engine and the combustion pressure sensor is mounted on the engine component for generating a signal representing engine combustion pressure.

2. Description of Related Art

Conventionally, as an example of the engine component with a combustion pressure sensor, a glow plug with a combustion pressure sensor to be used as an ignition aided device for starting a diesel engine, as disclosed in JP-7-139736, is known. A general construction of the conventional glow plug J1 with a combustion pressure sensor is shown in FIG. 12.

The conventional glow plug J1 with a combustion pressure sensor is comprised of a plug body 200 having a heater body 206 for generating heat when energized and a combustion pressure sensor 300 for generating a signal based on a force in responsive to combustion pressure acting on the plug body 200.

A part of the plug body 200 on an end side thereof is inserted into an installation hole 1b (plug hole, a threaded bore) formed in an engine head 1 of a diesel engine and firmly fixed to the engine head 1. A male thread 201a of a housing 201 is screwed into a female thread 1c of the installation hole 1b for fixing.

In the glow plug J1, a voltage is applied via a connecting cover 2 to a central axis 204 from an electric source (not shown). The central axis 204 is grounded via a heating coil 203, a sheath pipe 202, and the housing 201 to the engine head 1.

The heater body 206, which is composed of the heating coil 203 and the sheath pipe 202, generates heat for helping ignition of the diesel engine at its starting.

Further, the glow plug J1 has a sealing construction with which a leak of combustion gas through the installation hole 1b is prevented. As explosive combustion pressure in a combustion chamber 1a of the diesel engine is higher than that of a gasoline engine and, for example, increases up to 150 Mpa, it is very important to hold a close sealing not to leak combustion gas or pressure to outside. If leaked, the engine cannot be adequately operated due to a reduced engine output and a fluctuated engine revolution that may cause an engine vibration and a deteriorated acceleration, which a driver feels unfavorable.

To ensure the air tightness in the conventional glow plug J1, a housing taper portion 212 formed in the plug body 200 on a leading end side of the housing 201 and a taper seat surface portion 1d formed at an inner circumference of the installation hole 1b of the engine head 1 are provided to face to each other and come closely in pressurized contact with each other by screwing the housing 201 into the installation hole 1b with a recommended fastening torque for standardization (for example, 10 to 15 N·m).

More specifically, a taper angle of the housing taper portion 212 is larger, for example, by 3°, than that of the taper seat surface portion 1d. When the plug body 200 is fastened, the housing taper portion 212 comes firmly in a circumferential line contact with the taper seat surface portion Id and the plug body 200 is fixed to the engine head 1 in a state that a circumferential part of the housing taper portion 212 in the line contact cuts into the taper seat surface portion 1d. Accordingly, the combustion gas generated in the combustion chamber 1a is prevented from leaking outside so that the sealing is ensured.

The plug body 200 so fastened can maintain the rigid fixing with the engine head 1 due to a frictional force of the housing taper portion 212 and the taper seat surface portion 1d, a frictional force of the male thread 201a of the housing 201 and the female thread 1c of the installation hole 1b, and a mutual elastic force of the housing 201 and the engine head 1.

In the glow plug J1, a ring shaped combustion pressure sensor 300 is fitted into the housing 201 at an outer circumference of the housing 201 and fixed to a surface of the engine head 1 by screwing a fixing nut 310 for the sensor 300 into the male thread 201a of the housing 201.

The combustion sensor 300 may incorporate a piezoelectric member (not shown), as shown in JP-A-139736, which converts a force acting on the plug body 200 into an electric signal (electric charge) according to an piezoelectric characteristic and outputs the electric signal representing combustion pressure.

A load is applied in advance via the housing 201 of the plug body 200 to the combustion pressure sensor 300. Combustion pressure generated in the combustion chamber 1a is transmitted via the heater body 201 and the housing 201a to the male thread 201a. Accordingly, the housing 201 including the male thread 201a is pushed upward in an axial direction of the installation hole 1b so as to deform slightly so that the load to the combustion pressure sensor 300 may be eased. A change of the load is converted into the electric signal, which is an output from a lead wire 500, so that a change of combustion pressure is detected.

However, the conventional installation structure of the glow plug J1 with the combustion pressure sensor has some drawbacks. One of the drawbacks is that a transmitting efficiency of transmitting the force from the plug body 200 to the combustion pressure sensor 300 is low and an output sensitivity of the sensor 300 is not sufficient enough.

As the plug body 200 is rigidly fixed to the engine head 1 to ensure the air tightness with the recommended fastening torque for standardization so that the housing 201 for transmitting combustion pressure is firmly retained by both of the taper seat surface portion 1d and the female thread 1c in the installation hole 1b, an amount of the deformation of the plug body 200 is remarkably limited according to a change of combustion pressure. As a result, the change of the load is limited so that the output sensitivity of the combustion sensor 300 is low.

If a problem exists in that only the sensitivity is low, the sensitivity may be easily improved in use of an electric amplifying circuit. However, in this case, as mechanical vibration noises and electric noises are also amplified at the same time, a S/N ratio is not changed. Therefore, this is not a favorable solution to cope with the problem.

An experimental test result shows that an obtained output sensitivity (a generating charge per unit pressure pC/Mpa) of an engine component with the combustion pressure sensor shown in FIG. 12 is only 5% of that of the combustion pressure sensor 300 that is not installed in the plug body and the transmitting efficiency is remarkably low.

Another drawback is that the output sensitivity of the combustion pressure sensor 300 varies largely according to engine operating conditions. A linear expansion co-efficient of the housing 201, which is a part of the plug body 200, is largely different from that of the engine head 1 because of a material difference thereof. The linear expansion co-efficient of the housing 201(steel) is $12 \times 10^{-6}$(/° C.) and that of the engine head 1 (aluminum alloy) is $23 \times 10^{-6}$(/° C.).

As clearly understood from the fact that there is a difference of the linear expansion co-efficient therebetween, when both of the plug body 200 and the engine head 1 receive a heating effect after the plug body 200 is fixed to the engine head 1 at a normal temperature (room temperature), the engine head 1 expands more than the plug body 200 so that the load of the plug body 200 is eased and a fastening is loosened. As an engine speed as one of the engine operating conditions is higher, the fastening is further loosened since combustion temperature is more increased.

As mentioned above, since the loosing amount of the plug body 200, that is, the load (a fastening force) of the combustion pressure sensor 300 is changed by temperature variation, there exists a difference of the output sensitivity based on the high and low engine speed conditions.

According to an another experimental test using a pressure gauge with which a change of combustion pressure is directly detected from the combustion chamber (without an influence of installation thereto) by changing the engine operating conditions from a high speed to a low speed, the test result illustrates that the difference of high and low engine speed conditions brings a 25% difference with respect to the output sensitivity (pC/Mpa) of the sensor 300.

The two problems mentioned above are applicable not only to the installation structure of the glow plug with the combustion pressure sensor but also to that of any other engine component with the combustion pressure sensor, if a part of the engine component on one end side thereof is inserted into the installation hole formed in the engine and the combustion pressure sensor is mounted on the engine component for outputting a signal representing engine combustion pressure.

A spark plug, an injector and so on are typical examples as the engine component with the combustion pressure sensor. Each of the components is rigidly retained in the installation hole to secure the air tightness and there is a difference of the linear expansion co-efficient between the engine head and the engine component.

To study more details of the above problems, FIG. 13 shows a schematic view of the conventional installation structure of the glow plug J1 with the combustion pressure sensor in the engine head 1. The combustion pressure sensor 300 has a fixing nut 310, a base seat 340 and a piezoelectric element 320 put between the fixing nut 310 and the base seat 340. A taper contact portion S indicates a portion where the taper seat surface portion 1d and the housing taper portion contact each other. The taper contact portion S hold the load (axial load) in an axial direction of the installation hole 1b generated by fastening the plug body 200 to the engine head 1.

As shown in FIG. 13, it is presumed that transmitting elements of combustion pressure are basically composed of the housing 201 of the plug body 200 (presuming that the heater body 206 is integrated with the housing 201), the nut 310 of the combustion pressure sensor 300, the piezoelectric element 320, the basic seat 340, the engine head 1 and the taper contact portion S.

FIG. 14 shows an equivalent spring system model into which the transmitting elements mentioned above is converted, while the engine head 1 is bound. Each spring constant of the transmitting elements can be shown by $K = L/A \times E$ (mm/N) where an axial length of the element is L (mm), young's modulus thereof is E (N/mm$^2$), and a cross section area in a radial direction is A (mm$^2$).

Accordingly, a spring constant of the housing 201 kh, a spring constant of the nut 310 Kn, a spring constant of the piezoelectric element 320 Kp, a spring constant of the basic seat 340 Kd and a spring constant of the taper contact portion S Kt may be calculated, respectively. When combustion pressure force F is applied to the housing 201 (including the heater portion 206), a force P acting on the piezoelectric element 320, that is, a transmitting force, is shown by a following formula.

$$P = F \times Kt/(Kh + Kn + Kp + Kd)$$

The force P is represented as a function of the spring constant Kt of the taper contact portion S. Thus, as a value Kt is higher, that is, as the taper contact portion S is less resilient and more flexible and elastic, a transmitting efficiency of the combustion pressure force to the piezoelectric element 320 increases and the output sensitivity thereof increases.

According to the study mentioned above, it is understood that, as resiliency of the taper contact portion, that is, resiliency of a portion where the housing 201 comes in contact with the engine head 1 in the installation hole 1b, is lower, the transmitting efficiency of combustion pressure is increased.

SUMMARY OF THE INVENTION

An object of the present invention is to provide an installation structure of an engine component with a combustion pressure sensor to an engine in which a force is transmitted in a better way from the engine component to the combustion pressure sensor so that a sensor output sensitivity maybe improved and a change of the output sensitivity according to a change of engine operating conditions is limited.

To achieve the object, an installation hole is formed in the engine so as to penetrate from an outer surface thereof into a combustion chamber of the engine. The engine component is partly inserted into the installation hole and is fixed via an elastic member to the engine so as to come in pressurized contact therewith in an axial direction of the installation hole. With the installation structure mentioned above, the elastic member is elastically more deformable in an axial direction of the installation hole than a portion of the engine component on which the combustion pressure sensor is mounted.

It is preferable that the engine has a seat surface in the installation hole, the engine component has a contact surface to be seated via the elastic member on the seat surface, and the elastic member is a metal hollow ring whose circumference on one side thereof contacts the contact surface and whose circumference on the other side thereof contacts the seat surface. Alternatively, the elastic member may be a thin thickness portion of the engine component integrally formed therein and the thin thickness portion comes in pressurized contact with the seat the surface. Further, the elastic member may be a protruding portion of the engine protruding radially in the installation hole portion and the protruding portion comes in pressurized contact with the contact surface.

According to the conventional installation structure, the contact surface of the engine component and the seat surface of the engine are in direct and pressurized contact with and rigidly fixed to each other so that the output sensitivity is low. However, according to the present invention, force acting on the engine component in an axial direction of the installation hole responsive to combustion pressure is appropriately transmitted via the elastic member to the engine component so that the output sensitivity may be increased. Further, a gap between the engine component and the engine and a change of the load generated by a difference of linear expansion co-efficient there between are absorbed by the elastic member whose elasticity is lager. As a result, a change of the sensor output sensitivity due to a change of engine operating conditions may be reduced.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

FIG. 6A is a view of a first modification of the gasket;

FIG. 6B is a view taken along a line IVB—IVB of FIG. 6A;

FIG. 6C is a view of a second modification of the gasket;

FIG. 6D is a view taken along a line VID—VID of FIG. 6C;

FIG. 6E is a view of a third modification of the gasket;

FIG. 6F is a view taken along a line IVF—IVF of FIG. 6E;

FIG. 6G is a view of a fourth modification of the gasket;

FIG. 6H is a view taken along a line VIH—VIH of FIG. 6G;

DETAILED DESCRIPTION OF THE PREFERRED EMBODIMENTS

Figure 1:
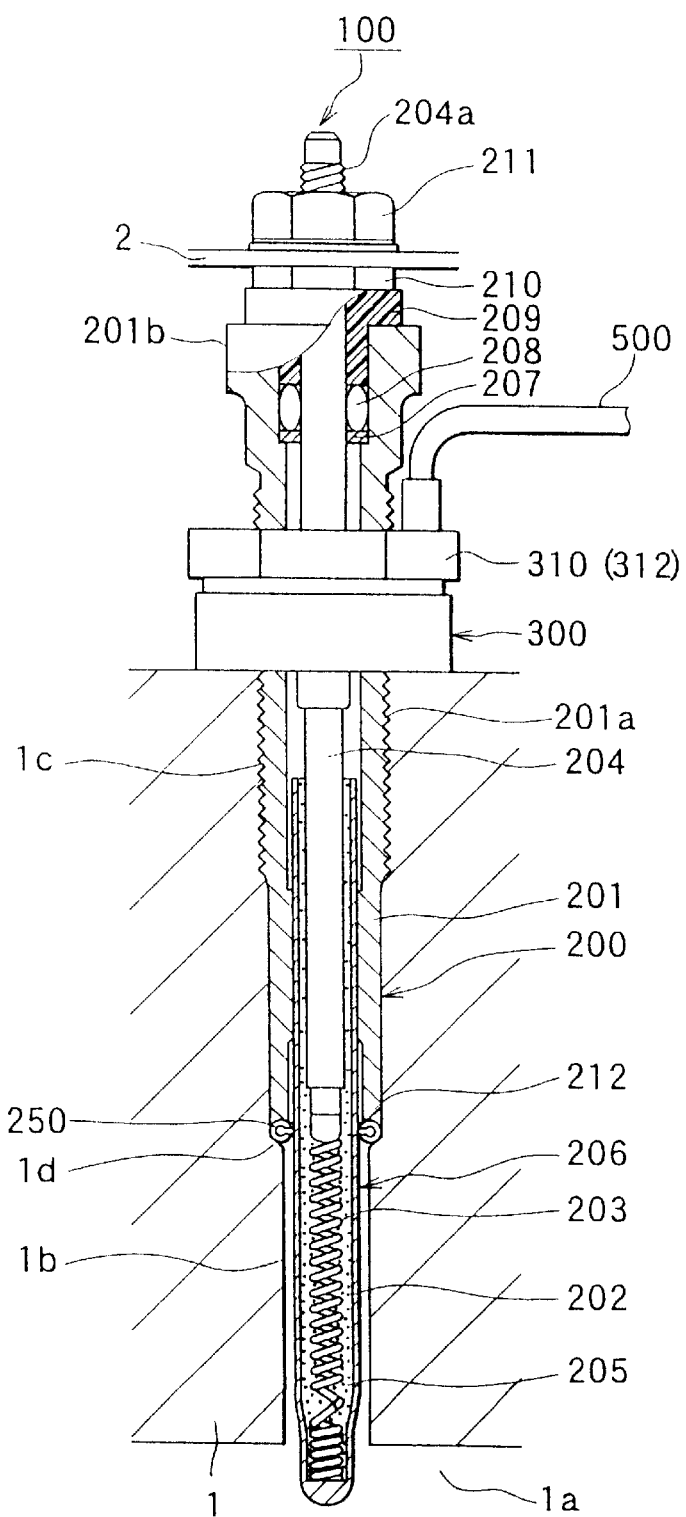
FIG. 1 is a partly cross sectional view showing an outline of an installation structure of a glow plug with a combustion pressure sensor in an engine according to an embodiment of the present invention.
Figure 12:
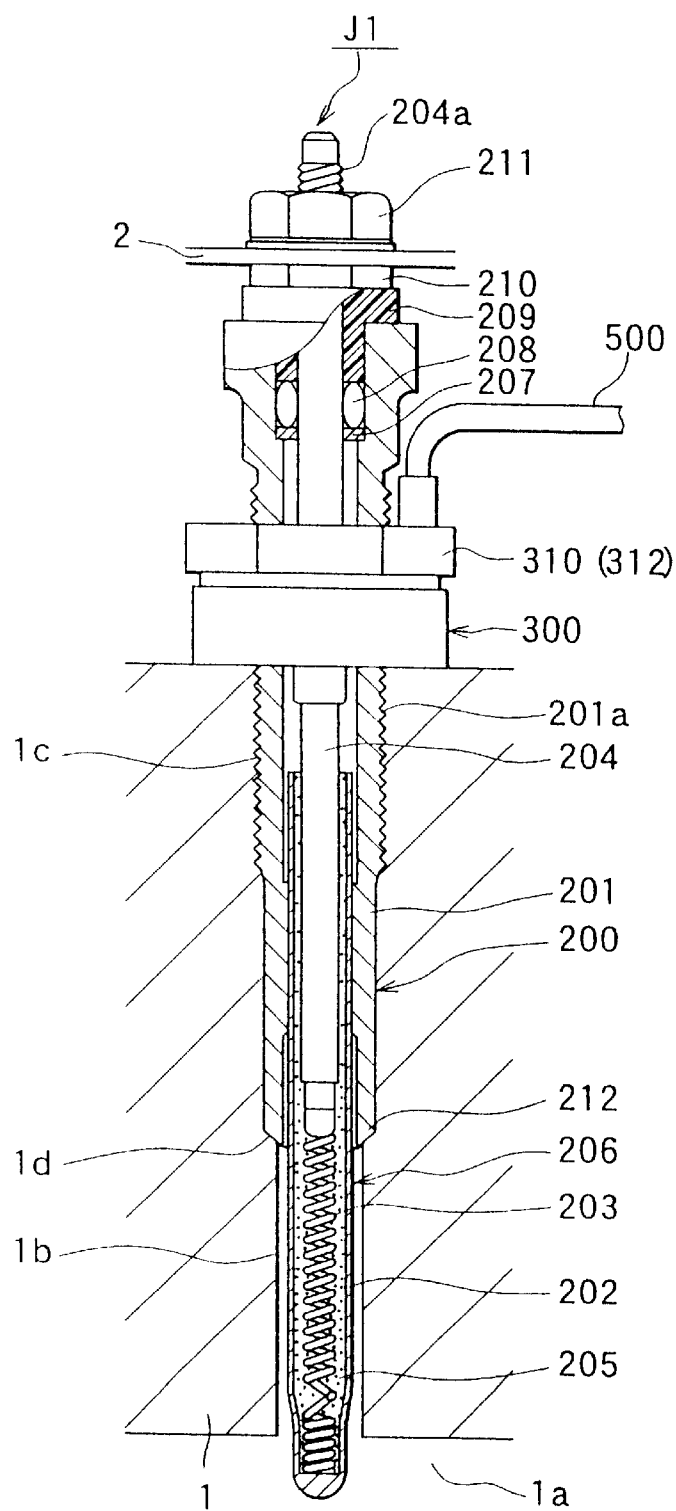
FIG. 12 is a partly cross sectional view showing an outline of a conventional installation structure of a glow plug with a combustion pressure sensor in an engine as a prior art.
Figure 13:
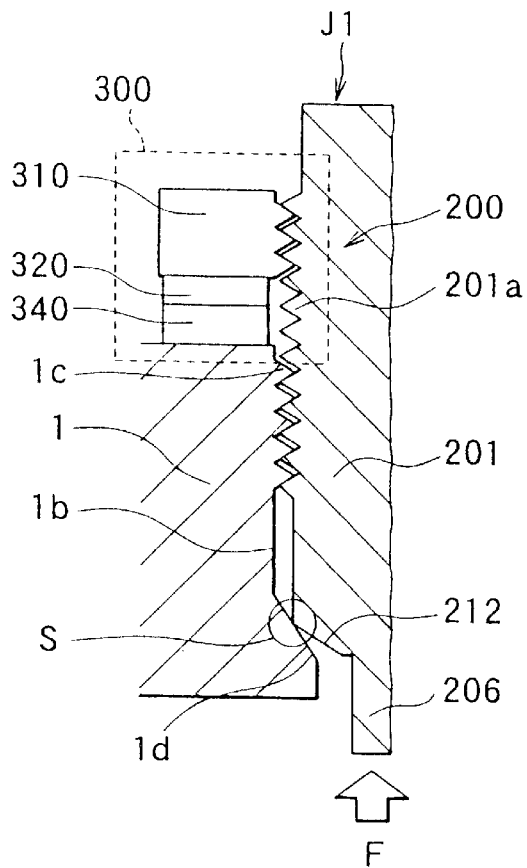
FIG. 13 is a schematic view showing elements of transmitting combustion pressure in the conventional installation structure.

An installation structure of an engine component with a combustion pressure sensor, typically, a glow plug with a combustion pressure sensor, in an engine according to an embodiment of the present invention is described with reference to drawings. FIG. 1 shows a partly cross sectional view of a whole construction of a glow plug 100 with a combustion pressure sensor installed in an engine head 1. Portions similar to those of FIG. 12 have same reference numbers affixed thereto as in FIG. 12.

The glow plug 100 is composed of a plug body 200 (an engine component of the present invention) having a heater body, through which engine combustion pressure is transmitted, a combustion pressure sensor 300 having a piezoelectric member that converts a force acting on the plug body 200 into an electric signal in accordance with a piezoelectric characteristic thereof and generating an output signal representing engine combustion pressure, and a lead wire 500 for sending the output signal from the combustion pressure sensor 300 to an outside circuit (ECU for vehicle in the present embodiment).

The engine head 1 is made of, for example, aluminum alloy or iron and is provided with an installation hole 1b (a plug hole, a threaded hole) penetrating from an outer surface thereof to a combustion chamber 1a inside thereof. A part of the plug body 200 on one end side thereof (lower end side in FIG. 1) is inserted into the installation hole 1b and is rigidly fixed to the engine head 1.

The plug body 200 has a cylindrical housing 201 made of metal (such as low carbon steel). The housing 201 is provided at an outer circumference with a male thread 201a that is screwed into a female thread of the installation hole 1b for fixing to the engine head 1. The plug body 200 is also provided inside the housing 201 with a cylindrical sheath pipe 202 held by the housing 201.

The sheath pipe 202 is made of heat resistant and erosion resistant alloy (for example, stainless steel SUS 310). One end (lower end in FIG. 1) of the sheath pipe 202 is closed and the other end thereof (upper side in FIG. 1) is opened. A heating coil 203, which is formed by resistance wires made of NiCr and CoFe, is housed in the sheath pipe 202 on the one end side. A part of a pole shaped central axis 204 made of metal is inserted into the sheath pipe 202 on the other end side.

One end of the heating coil 203 is connected to the closed end of the sheath pipe 202 and the other end of the heating coil 203 is connected to one end of the central axis 204. The sheath pipe 202 is filled with heat resistant insulating powder 205 such as oxide magnesium to insulate the central axis 204 and the heating coil 203 from the sheath pipe 202.

The sheath pipe 202 is formed through a swaging drawing process. Insulating powder 205 is staffed into inside of the sheath pipe 202 without voids and the central axis 204 and the heating coil 203 are rigidly fixed via the insulating powder 205 to the sheath pipe 202.

A portion of the sheath pipe 202 in which the heating coil 203 is housed, the heating coil 203 and the insulating powder 205 constitute a heater body 206. The heater body 206 is jointed with and held by an inside of the housing 201 in such a way that a part of the sheath pipe 202 on the one end side is exposed out of the housing 201. The heater body 206 (an outer circumference of the sheath pipe 202) is press fitted or bonded by silver-alloy brazing to the housing 201.

A washer 207 made of insulating material such as bakelite, and an o-ring 208 made of silicon or fluorine rubber are inserted into the central axis 204 inside the housing 201 on an upper side thereof. The washer 207 is arranged for a purpose of placing the central axis 204 at an axial center in the housing 201 and the o-ring 208 is arranged for a purpose of securing water proof and air tightness inside the housing 201.

The central axis 204 is provided on and along an outer circumference thereof with a terminal thread 204a and fixed via an insulating bush 209 made of insulating material such as phenol resin to the housing 201 by screwing a fixing nut 210 into the terminal thread 204a. The insulating bush 209 serves to prevent the central axis 204 from coming in contact with and making a short circuit with the housing 201.

A connecting bar 2 is fixed and connected in circuit by a terminal nut 211 to the terminal thread 204a provided in the central axis 204 on the other end side. The connecting bar 2 is connected to an electric source (not shown) and is grounded via the central axis 204, the heating coil 203, the sheath pipe 202 and the housing 201 to the engine head 1. Therefore, the heater body of the glow plug 100 can generate heat for an ignition aid of the diesel engine at a starting time.

Instead of the metal heater body composed of the metal resistance wire, a so called ceramic heater body in which conductive ceramic whose main contents are nitride silicon and silicon molybdenum is enveloped by sintered insulating ceramic whose main content is nitride silicon is employed as the heater body 206.

As a main gist of the present embodiment, an elastic member 250 is disposed between the plug 200 and an inner surface of the installation hole 1b in such a manner that the elastic member 250 generates an elastic force in an axial direction of the installation hole 1b (in an axial direction of the plug body 200). The plug body 200 is pressed via the elastic member 250 against the inner surface of the installation hole 1b at least in the axial direction of the installation hole 1b so that the air tightness in the combustion chamber 1a (inside the engine) may be secured.

In more details, the elastic member 250, as shown in FIG. 1, is a ring shaped hollow gasket 250 having a hole into which the heater body 206 of the plug body 200 is inserted. The gasket 250 is placed between a housing taper portion 212 and a taper seat surface portion 1d of the installation hole 1b and the housing taper portion 212 is pressed via the gasket 250 against the taper seat surface portion 1d in the axial direction of the installation hole 1b for securing the air tightness.

Figure 2A:
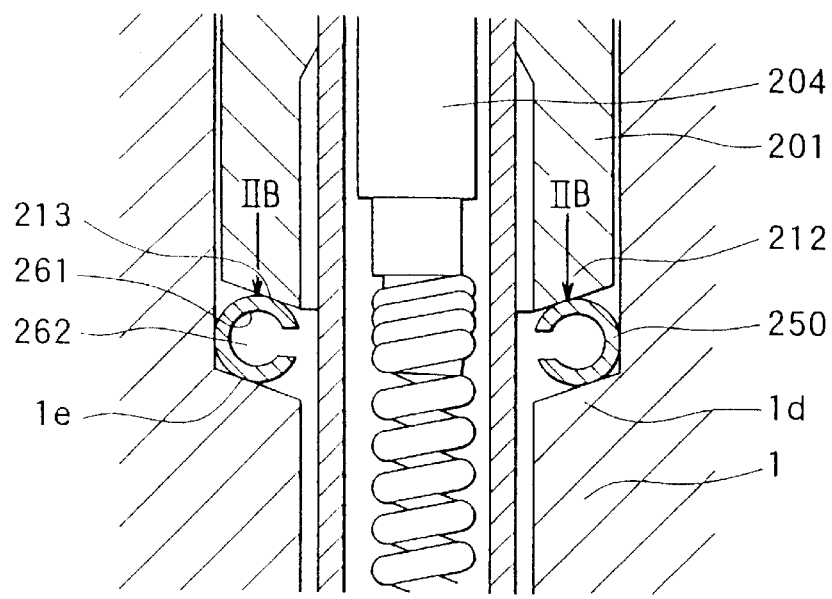
FIG. 2A is a partly enlarged view showing a portion of a gasket in the glow plug with the combustion pressure sensor of FIG. 1.
Figure 2B:
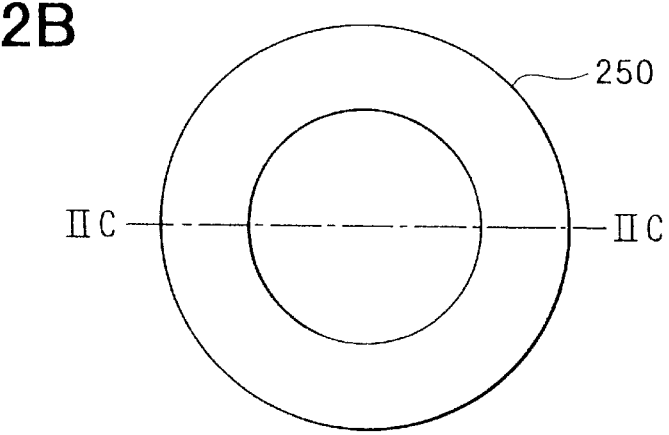
FIG. 2B is a view of the gasket viewed from an arrow IIB of FIG. 2A.
Figure 2C:
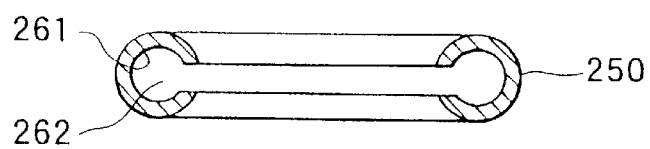
FIG. 2C is a cross sectional view along a line IIC—IIC of FIG. 2B.

As shown in FIGS. 2A, 2B and 2C, the gasket 250 is made of heat resistant and erosion resistant metal such as SUS 304 or Ni base alloy and is an elastic body generally called as a metal C seal having a circular tube which is formed by pressing in a ring shape whose cross section is a letter C. The metal C seal has no joints on a circumference thereof and has a large elastic force. As typical dimensions of the gasket 250, a tube diameter is φ1 mm, a plate thickness is 0.1 mm and an inner diameter is φ6 mm.

Not only the housing taper portion 212 is axially pressed against the taper seat surface portion 1d by the elastic force of the gasket in the axial direction of the installation hole 1b, but also the housing taper portion 212 is radially pressed against an inner surface of the installation hole 1b since the housing taper portion is formed in a taper shape, as shown in FIG. 2A, and the pressing force acts in a radial direction of the installation hole 1b, too.

The combustion pressure sensor 300 is formed in a ring shape as a whole and is fixed to an outer circumferential surface of a portion of the plug body 200 which protrudes axially from a surface of the engine head 1 in such a manner that the combustion pressure sensor 300 contacts the surface of the engine head 1.

Figure 3A:
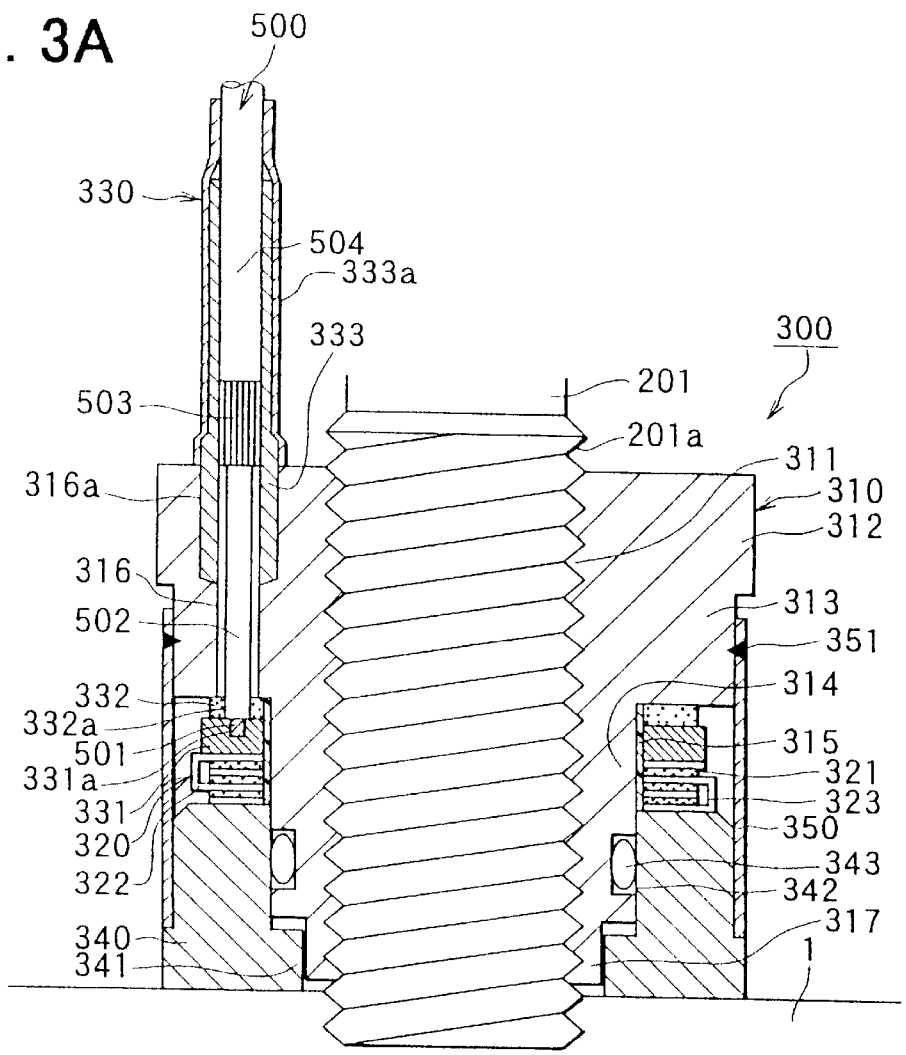
FIG. 3A is a partly enlarged cross sectional view of a portion of the combustion pressure sensor in the glow plug with the combustion pressure sensor of FIG. 1.
Figure 3B:
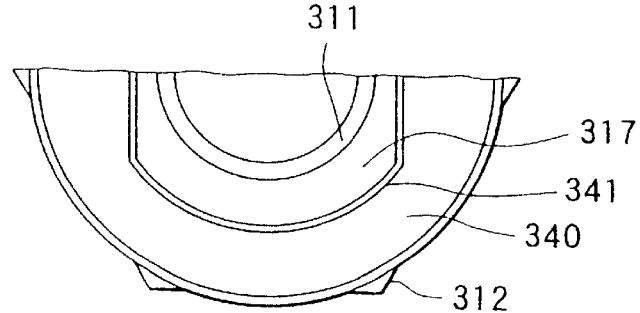
FIG. 3B is a view of the combustion pressure sensor viewed from an arrow IIIB of FIG. 3A.

As shown in FIGS. 3A and 3B, the combustion pressure sensor 300 is provided with a nut 310 (sensor fixing portion) for installing a sensor unit in the plug body 200, a piezoelectric member 320 generating an electric signal (electric charge) in accordance with a force responsive to combustion pressure, a lead portion 330 for picking up the electric signal generated in the piezoelectric member 320 and sending the same to the lead wire 500, a base seat 340 for holding the piezoelectric member 320 together with the nut 31 and also fixing a part of the lead portion 330, and a metal case 320 for securing a dust and water proof with respect to the piezoelectric member 320.

The nut 310 made of metal is provided with a thread portion 311 for fastening the nut 310 to an outer circumference of the housing 201 and fixing the sensor unit to the housing 201 by screwing into the thread 201a of the housing 201, a hexagonal portion 312, a large diameter portion 313 on a lower side of the hexagonal portion 312 and a small diameter portion 314 on a further lower side of the hexagonal portion 312. A heat shrinkable insulating tube 315 made of silicon is closely fitted to an outer circumference of the small diameter portion 314.

The lead portion 330 for connecting the piezoelectric member 320 in circuit to one end of the lead wire 500 is provided with an electrode 331, an insulator 332 and a fixing metal sheath 333. The electrode 331 is made of metal and formed in a ring shape. The insulator 332, which is made of insulating material such as mica or alumina, is disposed between the electrode 331 and the nut 310 for insulating the electrode 331 from the nut 310 the nut 31 and the base seat 340. The electrode 331 and the insulator 315 are fitted around an outer circumference of the insulating tube 315 surrounding and coating the small diameter portion 314 of the nut 310.

The lead wire 500 is composed of a conductive signal wire 501, an insulating coating 502, a conductive ground shield wire 503 and an insulating coating 505, which are piled up in order from an inside toward an outside. The signal wire 501 is insulated in circuit from the ground shield wire 503. Each of the signal wire 501, the insulating coating 502 and the ground shield wire 503 is partly exposed on the one end side of the lead wire 500.

The signal wire 501 on the one end side of the lead wire 500 passes through a hole 316 formed in the nut 310 and a bore 332a formed in the insulator 332 and is connected by welding to the electrode 331 at a hole 331a thereof. The other end of the lead wire 500 is coupled with a connector (not shown) to connect in circuit to an outside circuit (ECU for the vehicle).

The fixing metal sheath 333, which is cylindrical in shape, is disposed around an outer circumference of the lead wire 500 on the one end side thereof for fixing the lead wire 500 to the nut 310. The hole 316 of the nut 310 is further provided on an upper side thereof with a holding hole 316a for holding the fixing metal sheath 333. The fixing metal sheath 333 is partly inserted into and fixed to the holding hole 316.

The fixing metal sheath 333 is fixed by caulking to the lead wire 500 and also connected in circuit with the ground shield wire 503. An outer circumferential part of the fixing metal sheath 333 protruding from the holding hole 316 is covered with a heat shrinkable silicon insulating coating 333a.

The piezoelectric member 320 is formed in a ring shape so that an inner hole thereof faces the small diameter portion 314 of the nut 310 and installed via the insulating tube 315 around an outer circumference of the small diameter portion 314. The piezoelectric member 320 is composed of 3 layers piezoelectric ceramics 321(piezoelectric elements), a signal-transmitting washer 322 and a ground washer 323, which are piled up in each other.

The piezoelectric ceramics 321 are identical disks in dimension each formed in a ring shape and made of titanium oxide lead or titanium-zirconium oxide lead. The 3 layers of the piezoelectric ceramics 321 are connected in circuit in parallel to each other. Respective output sensitivities of the 3 layers of the piezoelectric ceramics 321 are summed so that a total sensitivity is remarkably improved.

The base seat 340, which is metal and formed in near ring shape, is provided on an inner side surface thereof on a side of contacting the engine head 1 with a rotation stopper 341. As shown in FIG. 3B, the rotation stopper 341 is formed in a shape corresponding to an oval shape of a rotation stopper 317 provided in a leading end of the small diameter portion 314 of the nut 310 and fitted into the rotation stopper 314. Accordingly, the rotation of the base seat 340 relative to the nut 310 in an angular direction of the plug is prevented.

A cylindrical metal case 350 made of metal such as SUS 304 surrounds an outer periphery of the base seat 340 so as to envelop all over an outer circumference of the combustion pressure sensor 300. The metal case 350 is formed in a cylindrical shape by drawing a thin metal sheet whose thickness is less than 0.5 mm and bonded to the circumference of the base seat 340 by laser welding or cupper brazing.

The metal case 350 is integrated with the base seat 340 in a state that the rotation stopper 341 is accurately fitted to the rotation stopper 317 of the nut 310. The base seat 340 is closely fitted to the small diameter portion 314 of the nut 310 via an o-ring 343 made of silicon or fluorine rubber which is housed in a groove provided at a near center of the small diameter portion 314. An inner periphery surface of the metal case 350 is fitted to an outer surface of the large diameter portion 350 of the nut 310 and a whole circumference of the internal fitting portion between the metal case 350 and the large diameter portion 350 is bonded by YAG laser welding.

The base seat 340 is pressed against the surface of the engine head 1 by an axial force (screw fastening force) of the nut 310. The piezoelectric member 320, the electrode 331 and the insulator 332 are held between the nut 310 and the base seat 340 and fixed by the axial force of the nut 310 therebetween.

The combustion pressure sensor 300 is assembled as follows. The signal wire 501 on the one end side of the lead wire 500 is welded to the hole 331a of the electrode 331. The fixing metal sheath 33 is inserted into the holding hole 316a of the nut 310 and bonded thereto by welding or cupper brazing. The insulator 332 is installed on the small diameter portion of the nut 310.

Then, while the other end of the lead wire 500 inserted from a side of insulator into the hole 316 of the nut 310 in which the fixing metal sheath 333 and the insulator 332 have been installed, the electrode 331 to which the one end of the lead wire 500 has connected is fitted to the small diameter portion 314 of the nut 310.

After placing the electrode 331 at a predetermined position, the fixing metal sheath 333 and the ground shield wire 503 are fixed by caulking. The ground shield wire 503 is connected in circuit to the fixing metal sheath 333. Then, a part of the lead wire 500 and the fixing metal sheath 333 are covered by the insulating coating 333a for the dust proof and the water proof.

The piezoelectric member 320 having the piezoelectric ceramics 321 and the washers 322 and 323 is inserted into the small diameter portion 314 of the nut 310. Then, the base seat 340 integrated with the metal case 350 by brazing is inserted into the small diameter portion 314 of the nut 310, while the rotation stopper 317 is coupled with the rotation stopper 341. Then, the metal case 350 is bonded to the large diameter portion 313 of the nut 310 by laser welding in a state that the nut 310 and the base seat 340 are closely contacted and pressed to each other.

After completing the combustion pressure sensor 300 as mentioned above, the combustion pressure sensor 300 is inserted from a side of the heater body 206 into the plug body 200 and assembled tentatively to the plug body 200 by screwing the thread 311 of the nut 310 into the thread 201a of the housing 201 in use of the hexagonal portion 312. Then, after the gasket 250 is placed on the taper seat surface portion 1d in the installation hole 1b, the plug body 200 tentatively assembled is inserted from the one end side (from the heater body side) into the installation hole 1b.

Next, the plug body 200 is screwed into and fastened to the installation hole 1b by turning in an angular direction a hexagonal portion 201b (refer to FIG. 1) of the housing 201 with a tool such as a wrench (not shown). Further, by fastening the nut 310 of the combustion pressure sensor 300 with the wrench, the sensor 300 is fixed to the surface of the engine head 1. Thus, the engine component with the combustion pressure sensor shown in FIG. 1 is completed.

An operation of the present embodiment is described hereinafter. A voltage is applied from an electric source (not shown) via the connecting bar 2 to the plug body for starting the diesel engine and is grounded via the central axis 204, the heating coil 203, the sheath pipe 202 and the housing 201 to the engine head 1. Accordingly, the heater body 206 generates heat for the ignition aid of the diesel engine at the starting time.

After the engine starts, combustion pressure generated in the engine is transmitted via the heater body 206 and the housing 201 to the thread 201a. Combustion pressure transmitted to the thread 201a serves to loose a fastening torque of the glow plug 100 to the engine head 1. Therefore, the load (in an axial direction of the plug body) in the combustion pressure sensor 300, which is applied via the thread 311 of the nut 310 to the piezoelectric ceramics 321, is eased. That is, a loading state of the piezoelectric ceramics 321 is changed.

Charges to be generated as an output of the electric signal according to piezoelectric characteristics of the piezoelectric ceramics 321 are changed. The changed electric signal (charge) is sent from the electrode 331 and the lead wire 500 to the outside circuit in which the electric signal is converted into voltage and, after passing through amplifying and filtering processes, is used as a combustion pressure wave signal applicable for combustion control. That is a process of detecting combustion pressure in the glow plug 100.

The embodiment mentioned above has a distinctive feature that the gasket 250 (elastic member) is placed between the housing taper portion 212 and the taper seat surface portion 1d and presses the housing taper portion 212 and the taper seat surface portion 1d in an axial direction so that the air tightness in the combustion chamber 1a may be assured.

With the distinctive feature mentioned above, when the plug body 200 is fastened by the axial load which falls within an allowable elastic force of the gasket 250, the housing taper portion 212 and the taper seat surface portion 1d are alternately pressed by the gasket due to the elastic force of the gasket 250 owned by itself. As a result, the higher air tightness is maintained.

Figure 14:
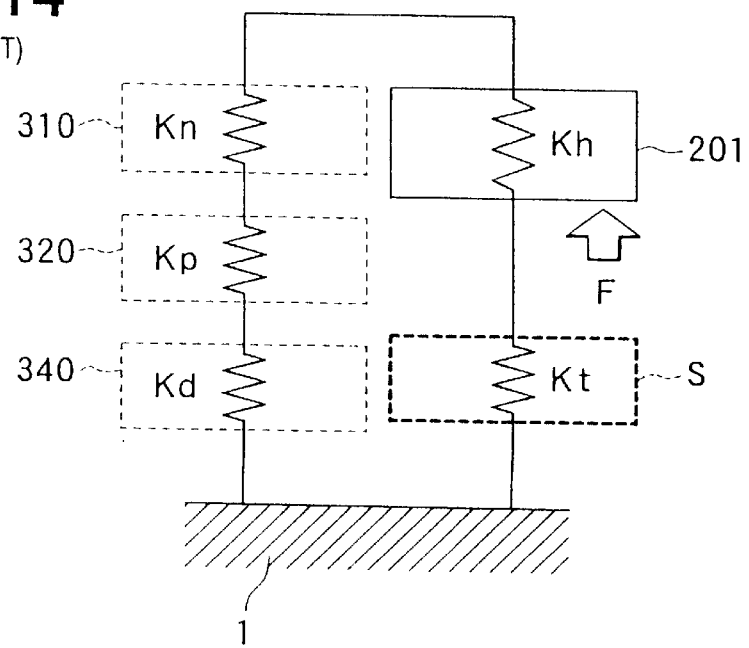
FIG. 14 is a network showing an equivalent spring system model into which the conventional installation structure is converted.

Further, the force based on combustion pressure acting in an axial direction of the installation hole 1b can be beneficially transmitted to the housing 201 of the plug body 200 due to the elastic force of the gasket 250 to improve the sensor sensitivity since a resilient value of the taper contact portion in the equivalent spring system model shown in FIG. 14 is limited.

Furthermore, the gasket 250 serves to limit a change of the output sensitivity caused by a looseness of the plug body 200 due to heat. This is because that a change of a gap between the housing taper portion 212 and the taper seat surface portion 1d generated due to a linear expansion co-efficient difference and a change of the consequent axial load are mostly absorbed by a compression recovery force of the gasket 250. That is, the change of the load, which adversely affect on the output sensitivity of the combustion pressure sensor 300, can be lowered.

As mentioned above, the glow plug 100 with the combustion pressure sensor in which the elastic member 250 is inserted between the taper portions according to the present embodiment has an advantage that the output sensitivity of the sensor is improved and a change of the output sensitivity of the sensor to be caused by a change of engine operating conditions is limited without adversely affecting on main functions of the glow plug 100.

When the gasket 250 placed between the housing taper portion 212 and the taper seat surface portion 1d receives combustion pressure (at a time of increasing combustion pressure), the combustion pressure F is applied nearly uniformly to an inner surface 261 of the gasket 250, as shown in FIG. 2A. The combustion pressure F acts to expand radially the inner surface of the gasket 250.

Accordingly, in addition to face pressure based on the axial load generated when the plug body is fastened, internal pressure due to the combustion pressure F is further applied to a housing contact portion 213 and a seat surface contact portion 1e, both of which are surfaces in contact with the gasket 250. As a result, both contact surfaces 213 and 1e are more strongly pressed to secure a higher degree of the air tightness during the engine operation.

According to a test result of an experimental test, it is concluded that the elastic member has to endure more than 2 KN force or load causing a plastic deformation in view of maintaining the air tightness, while the gasket 250 is more effective as the elastic force of the gasket 250 is larger (more flexible). A spring constant of the gasket (elastic member) showing favorable result in the above experimental test is 2.5 to 20 $(x \cdot 10^{-5}$ mm/N).

The fastening torque of the plug body 200 itself (glow plug without the sensor) is primarily standardized and is 10 to 15 N·m in case that a thread size at a screw portion of a housing commonly used is M 10×1.25. A value converted ) into the axial load is presumably 4 to 6 kN. It is thought that this value is necessary not only for securing the air tightness but also for preventing the looseness of the plug body 200 due to vibration. The minimum value 2 kN or more as the endurance force of the elastic member based on the experimental test mentioned above seems to be a little small for preventing the looseness, judging from the above standard value of the glow plug itself.

In the case of the glow plug without the sensor, the glow plug is fixed to the engine head 1 based on 3 elements consisting of a frictional force between the housing taper portion 212 and the taper seat surface portion 1d, a frictional force between the thread 201a of the housing 201 and the thread 1c of the installation hole 1b, and mutual elastic forces of the housing 201 and the engine head 1. However, in the case of the glow plug 100 with the combustion pressure sensor, the plug body 200 is fixed to the engine head 1 based on 6 elements consisting of a frictional force between and elastic forces of the housing taper portion 212 and the gasket 250, a frictional force between the thread 201a of the housing 201 and the thread 1c of the installation hole 1b, a frictional force between and elastic forces of the thread 311 of the nut 310 of the combustion pressure sensor 300 and the thread 201a of the housing 201, and a frictional force between the base seat 340 of the combustion pressure sensor 300 and the engine head 1.

Accordingly, in the glow plug with the combustion pressure sensor according to the embodiment, there exist practically no problems of the looseness due to vibration. According to a vibration endurance test conducted on the plug body 200 with the combustion pressure sensor 300 in a state shown in FIG. 1 in use of a vibration exciter under conditions of 50 to 2000 Hz and 25 to 10 G acceleration speed, it is proved that both of the plug body 200 and the combustion pressure sensor 300 are not loosed.

Figure 4A:
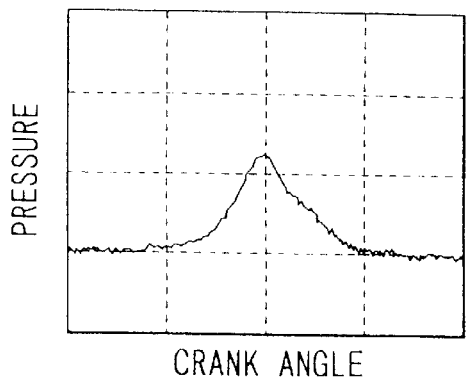
FIG. 4A is a combustion pressure wave form according to a conventional embodiment.
Figure 4B:
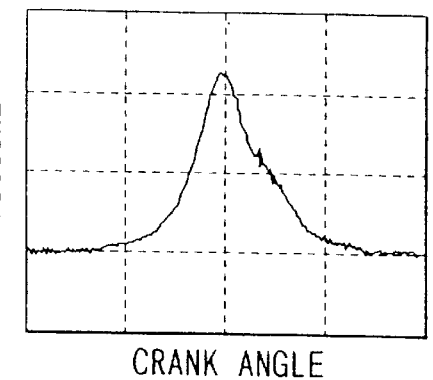
FIG. 4B is a combustion pressure wave form according to the embodiment of the present invention.
Figure 4C:
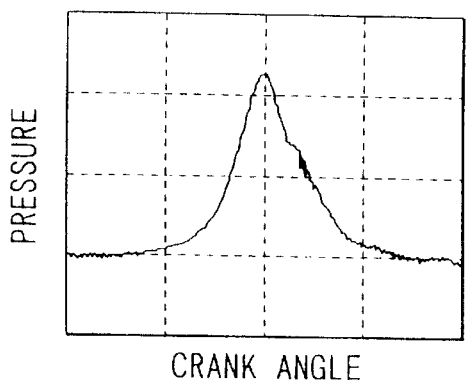
FIG. 4C is another combustion pressure wave form according to the embodiment of the present invention.
Figure 4D:
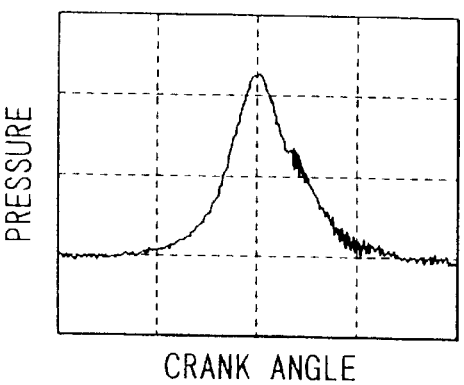
FIG. 4D is another combustion pressure wave form according to the conventional embodiment.
Figure 4E:
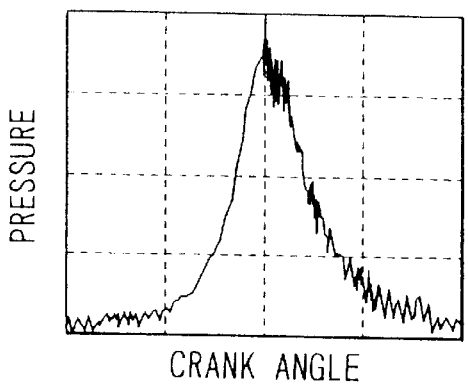
FIG. 4E is still another combustion pressure wave form according to the embodiment of the present invention.
Figure 4F:
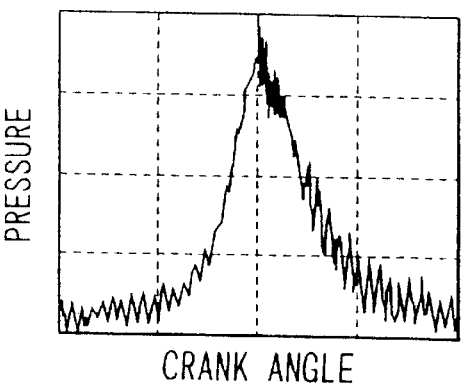
FIG. 4F is still another combustion pressure wave form according to the conventional embodiment.

FIGS. 4A to 4F show a comparison of combustion pressure waveforms between the present embodiment and the conventional one. FIGS. 4B, 4C and 4E show the combustion pressure waveforms of the glow plug 100 with the combustion pressure sensor. FIGS. 4A, 4D and 4F show the combustion pressure waveforms of the conventional embodiment having the glow plug J1 with the combustion pressure sensor (refer to FIG. 12) FIGS. 4A to 4D show test results under engine operating conditions of 2000 rpm and 50 N·m load and FIGS. 4E and 4F show test results under engine operating conditions of 4000 rpm and a full load.

As shown in FIGS. 4A and 4B, the output sensitivity (height of waveform) of the combustion pressure sensor of the present embodiment having the gasket 300 as the elastic member is twice, compared with that of the conventional embodiment.

FIGS. 4D and 4F show the waveforms obtained by amplifying about twice the output signals of the combustion pressure sensor of the conventional embodiment in use of an amplifying circuit in order to make the output sensitivity or the height of the waveforms thereof nearly even to that of the waveforms according to the present embodiment. It can be concluded from these test results that S/N ratio of the output signal of the present embodiment shown in FIGS. 4C and 4E, whose output sensitivity of the combustion pressure sensor is larger, is superior to that of the conventional embodiment shown in FIG. 4D and 4F.

Further, with respect to the change of the load of the combustion pressure sensor 300 due to heat change, that is, due to a change of the engine operating conditions, another experimental test results show that, under engine operating conditions covering from an idling to 4000 rpm·full load, a sensitivity change of the present embodiment having the gasket 250 is 10% and that of the conventional embodiment is 25%, compared with the value measured by the pressure gauge. (Other embodiments)

Figure 5:
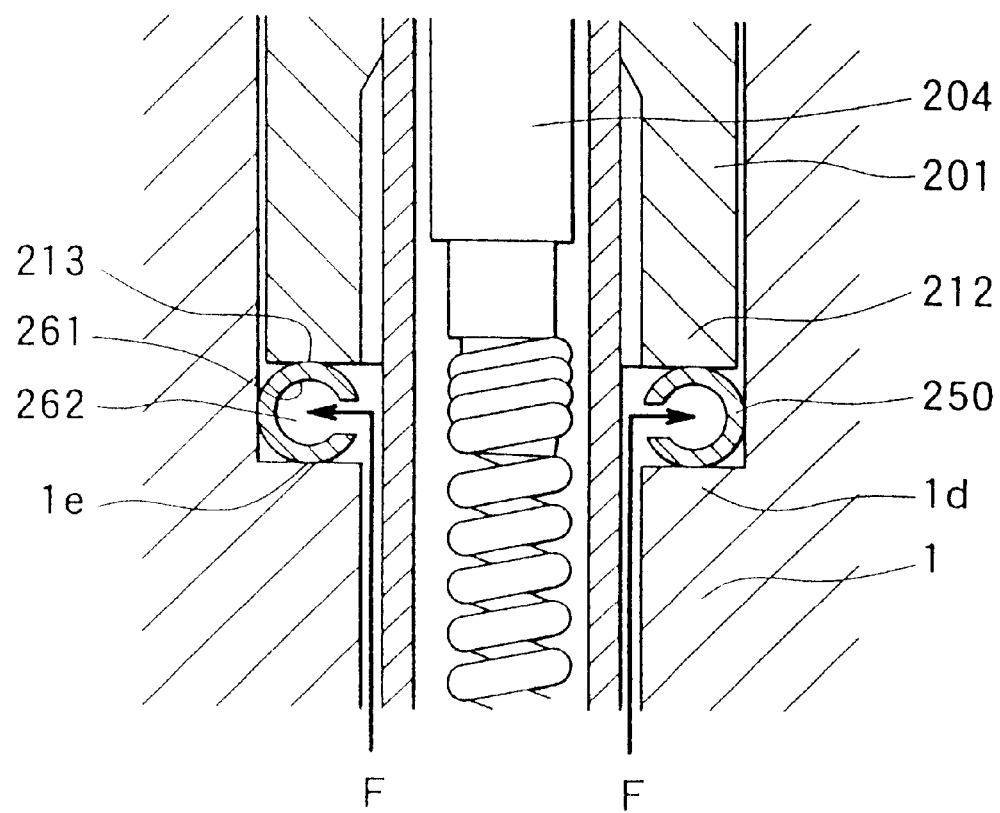
FIG. 5 is a partly enlarged cross sectional view showing a modification of the portion of the gasket in the glow plug with the combustion pressure sensor.

Instead of the housing taper portion 212 and the taper seat surface portion 1d between which the gasket 250 is put, portions of the housing 201 and the installation hole 1b between which the gasket is put are not tapered surfaces but may be right-angled flat surfaces confronting to each other, as shown in FIG. 5.

The elastic ring shaped gasket 250 having no joints on the circumference thereof may be modified to any one of the shapes as shown in FIGS. 6A to 6H.

A gasket 250 shown in FIGS. 6A and 6B as a first modification has a groove on an outer circumferential surface thereof. A gasket 250 shown in FIGS. 6C and 6D as a second modification is formed in a hollow o-ring shape and has a pressure introduction hole 250a on an inner circumference thereof, which has a same effect as the gasket 250 shown in FIGS. 2A to 2C. The pressure introduction hole 250 is not always essential. A gasket 250 shown in FIGS. 6E and 6F as a third modification is a ring whose cross section is filled and shaped circular. A gasket 250 shown in FIGS. 6G and 6H as a fourth modification is a ring whose cross section is shaped a rectangular so that the gasket 250 comes in surface contact with the housing taper portion 212 and the taper seat surface portion 1d. The cross sectional shape of the gasket 250 is not limited to the rectangular but may be a polygon if the gasket 250 comes in surface contact with the tapered portions or may be a triangle so that the gasket 250 comes in surface contact with one of the tapered portions and in line contact with the other of the tapered portions.

As mentioned above, material, a dimension and the cross sectional shape of the ring gasket 250 may be modified to have a spring constant adequate to a given condition. The values (mm/N) of respective spring constants of the first to fourth modification of the gasket 250 are smaller in order. Further, instead of the gasket 250 mentioned above, an elastic member, as shown in FIG. 7 or 8, may be employed.

Figure 7:
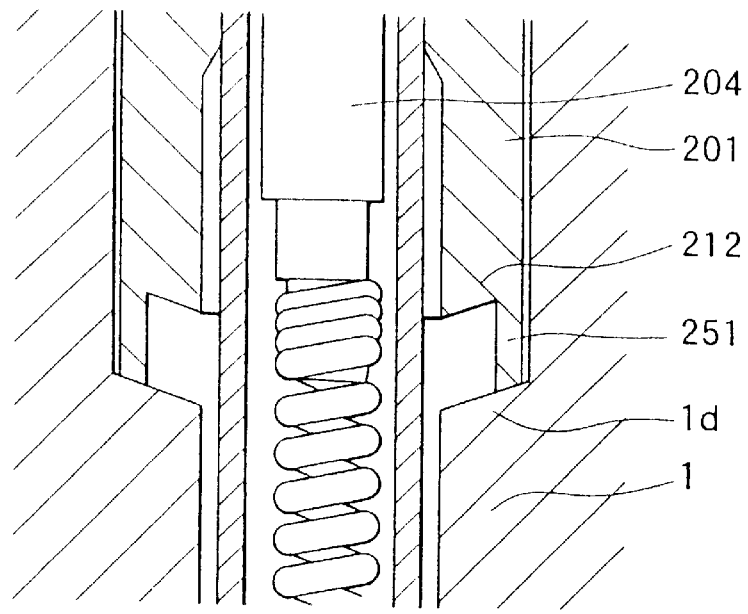
FIG. 7 is an enlarged cross sectional view showing a thin thickness portion of a housing constituting an elastic member according to another embodiment of the present invention.

The elastic member shown in FIG. 7 is a partly thin thickness portion 251 of the housing 201 that is formed by machining a leading end of the housing 201 so as to have elasticity. The thin thickness portion 251 is pressed against the taper seat surface portion 1d. That is, the plug body 200 is pressed in an axial direction of the installation hole 1b via the thin thickness portion 251 functioning as the elastic member against the inner surface of the installation hole 1b.

Figure 8:
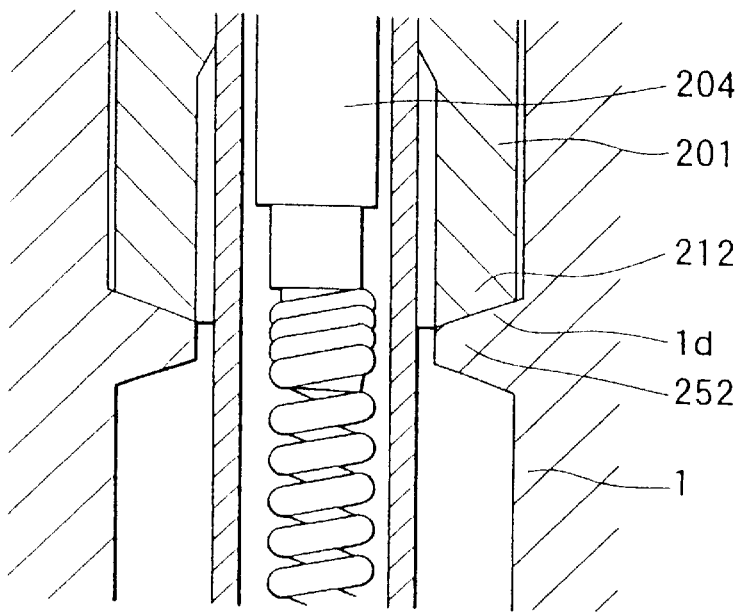
FIG. 8 is an enlarged cross sectional view showing a protruding portion of an engine head protruding into an installation hole for constituting a elastic member according to a further embodiment of the present invention.

The elastic member shown in FIG. 8 is a part of the engine head 1 which is formed by machining to have elasticity, that is, a protruding portion 252 of the engine head 1 protruding radially in the installation hole 1b. The protruding portion 252 constitutes a surface which receives the axial load of the plug body 200. The housing taper portion 212 is pressed in an axial direction of the installation hole 1b against the taper seat surface portion 1d provided on the protruding portion 252.

As shown in FIG. 7 or 8, the elastic member 251 or 252 may be integrally formed with the plug body 200 or the engine head 1b. The elastic member 251 or 252 is superior to the gasket 250 separately provided as far as the assembling easiness is concerned.

The gist of the present invention mentioned above is not limited to the application to the glow plug with the combustion pressure sensor but applicable to any other engine component (for example, an injector, a volt and a spark plug) with the combustion pressure sensor, if a part of the engine component on one end side thereof is inserted into the installation hole formed in the engine and the combustion pressure sensor is installed in the engine component for outputting a signal representing engine combustion pressure.

Figure 9:
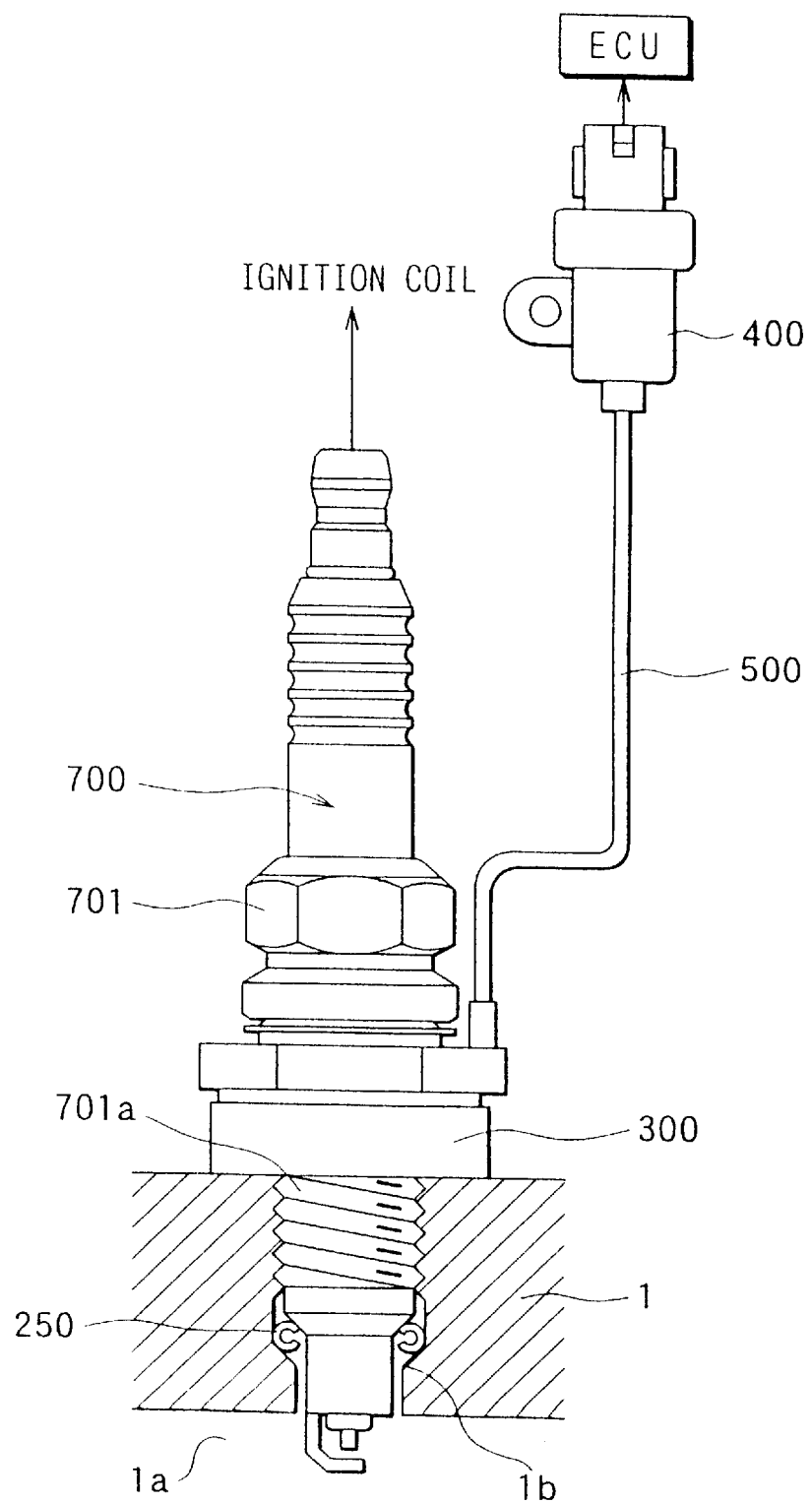
FIG. 9 is a partly cross sectional view showing an outline of an installation structure of a spark plug with a combustion pressure sensor in an engine to which the gasket as a gist of the present invention is applied.
Figure 10:
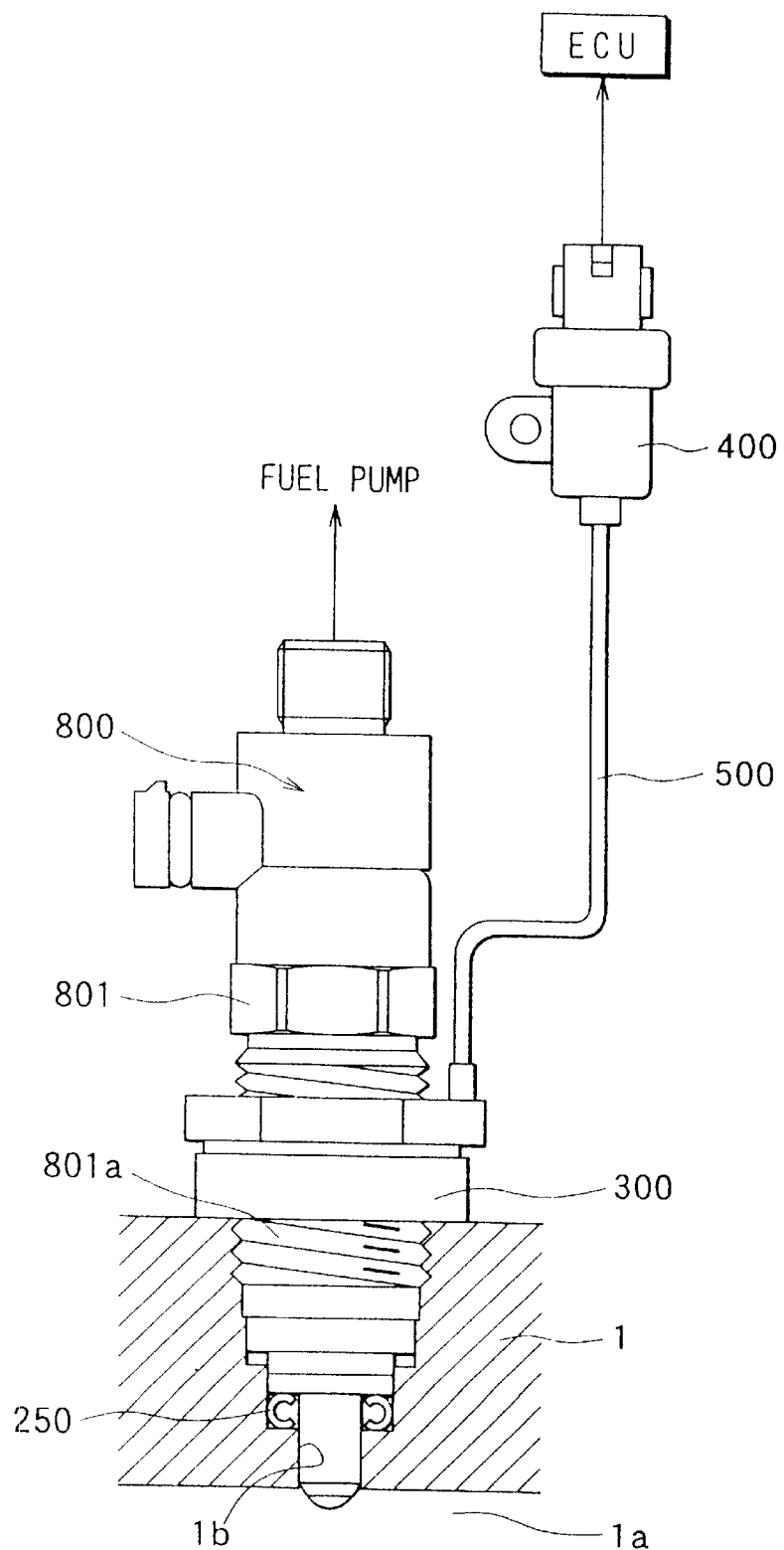
FIG. 10 is a partly cross sectional view showing an outline of an installation structure of an injector with a combustion pressure sensor in an engine to which the gasket as a gist of the present invention is applied.
Figure 11:
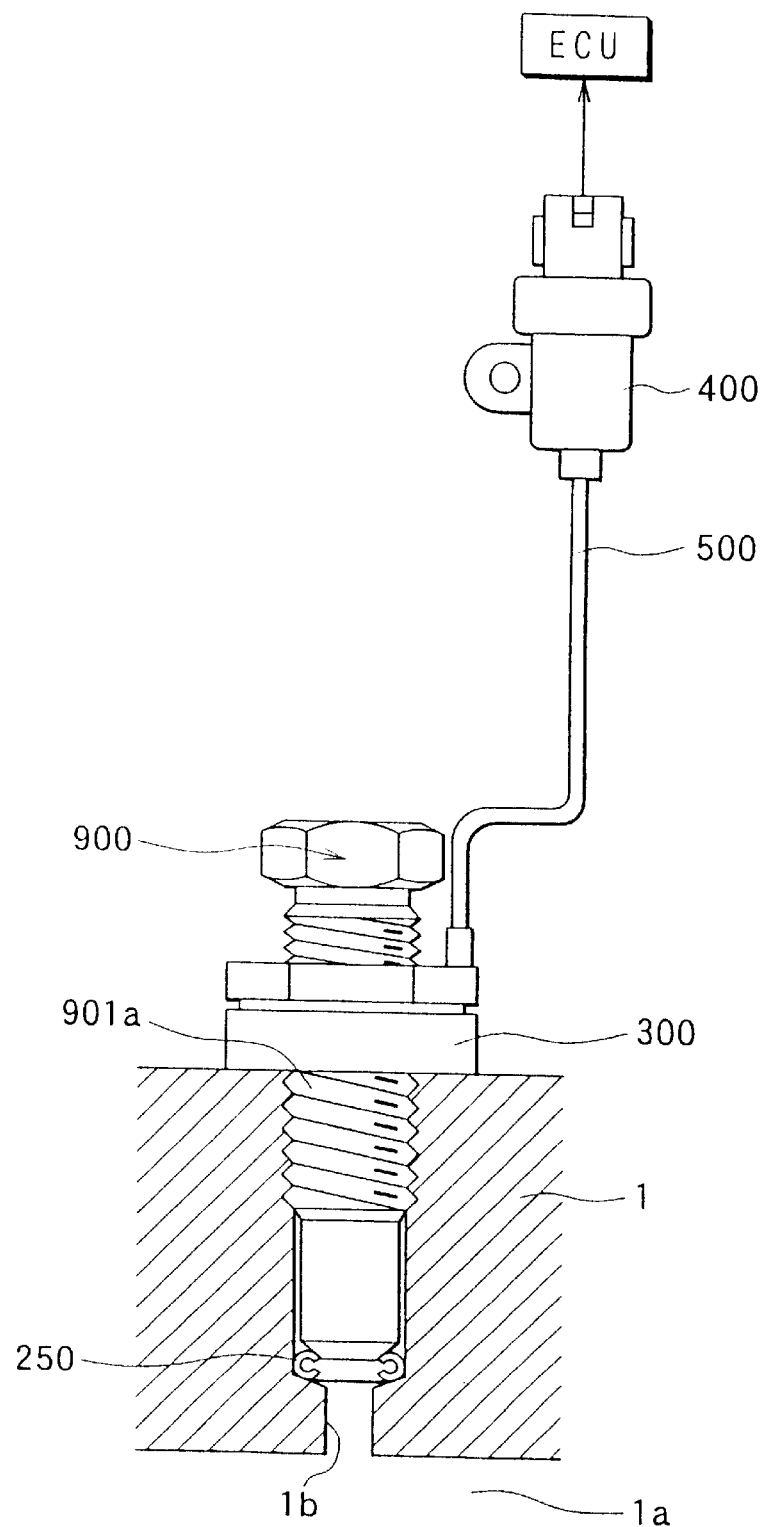
FIG. 11 is a partly cross sectional view showing an outline of an installation structure of a volt with a combustion pressure sensor in an engine to which the gasket as a gist of the present invention is applied.

An application example to a spark plug is shown in FIG. 9, to an injector 800 in FIG. 10 and to a volt 900 in FIG. 11, respectively.

As shown in FIG. 9, the spark plug 700 (one of engine components) is fixed to the installation hole 1b of the engine head 1 for gasoline engines by a thread 701a formed in a housing 701 into. Further, as shown in FIG. 10, the injector 800 (one of engine components) for injecting fuel from a fuel pump to the combustion chamber 1a is fixed to the installation hole 1b of the engine head 1 for gasoline or diesel engines by a fixing volt 801 and a thread 801a. Furthermore, as shown in FIG. 11, the volt 900(one of engine components), which is partly exposed to the combustion chamber 1a in the engine, is fixed to the installation hole 1b of the engine head 1 by a thread 901a.

The combustion pressure sensor 300 is mounted on each of the thread 701a, 801a and 901a of the respective engine components. The combustion pressure sensor detects engine combustion pressure in such a manner that a force acting on the engine component responsive to combustion pressure is converted into an electric signal according to piezoelectric characteristics of the piezoelectric element 321.

As shown in FIG. 9, 10 or 11, the gasket 250 (elastic member) elastically deformable in an axial direction of the installation hole 1b is placed between the engine component 700, 800 or 900 and the installation hole 1b and the engine component 700, 800 or 900 is pressed at least in an axial direction of the installation hole 1b via the gasket 250 against the inner surface of the installation hole 1b. The gasket 250 may be modified similarly to any other type of the elastic members mentioned in the other embodiments.

Instead of the installation structure that the engine component 200, 700, 800 or 900 is fastened to the installation hole 1b by the thread 201a, 701a, 801a or 901a formed around the outer circumference of the engine component

200, 700, 800 or 900, it is possible to have an installation structure that the engine component 200, 700, 800 or 900 is rigidly fixed to the installation hole 1b by pushing the engine component from an outside thereof in an axial direction of the installation hole 1b in use of a retaining member such as a flange provided separately from or integrally with the engine component.

What is claimed is:

1. An installation structure of an engine component with a combustion pressure sensor in an engine having a combustion chamber, the combustion pressure sensor being mounted on the engine component for generating an output signal based on a force acting on the engine component responsive to combustion pressure of the combustion chamber, comprising:
   an installation hole formed in the engine so as to penetrate from outside into the combustion chamber;
   an elastic member positioned in the installation hole, the elastic member comprising at least one of a separate body from the engine component and the engine, an integral part of the engine component and an integral part of the engine,
   wherein the engine component is partly inserted into the installation hole and air tightly fixed via the elastic element to the engine so that the engine component comes in pressurized contact with the engine in an axial direction of the installation hole, and, further,
   wherein the elastic member is elastically more deformable in an axial direction of the installation hole than a portion of the engine component on which the combustion pressure sensor is mounted.

2. An installation structure according to claim 1, wherein the installation hole is provided at an inside surface thereof with a seat surface, the engine component has a contact surface, and the elastic member is a metal hollow ring whose circumference on one side thereof contacts the contact surface and whose circumference on the other side thereof contacts the seat surface.

3. An installation structure according to claim 1, wherein the installation hole is provided at an inside surface thereof with a seat surface and the elastic member is a thin thickness portion of the engine component integrally formed therein and the thin thickness portion comes in pressurized contact with the seat surface.

4. An installation structure according to claim 1, wherein the engine component has a contact surface, the elastic member is a protruding portion of the engine protruding radially in the installation hole and the protruding portion is provided with a seat surface which comes in pressurized contact with the contact surface.

5. An installation structure according to claim 1, wherein the engine component is provided at an outer circumferential surface thereof with a male thread and the installation hole is provided at an inner circumferential surface thereof with a female thread, and, further, wherein the engine component is fastened to the engine by screwing the male thread into the female thread.

6. An installation structure according to claim 1, wherein a spring constant of the elastic member falls within a range of 2.5 to $20 \times 10^{-5}$ mm/N.

7. An installation structure according to claim 1, wherein the combustion pressure sensor is fixed to an outer circumferential surface of a portion of the engine component that protrudes from a surface of the engine and is in direct contact with the surface of the engine.

8. An assembly of an engine component having a combustion pressure sensor and an engine having a combustion chamber, comprising:
   an installation hole defined in the engine so as to extend from an outside surface of the engine to the combustion chamber;
   the engine component including an insertion part, said engine component being secured to said engine so that said insertion part is disposed in said installation hole;
   an elastic part disposed in the installation hole at an axial abutment between said insertion part and a wall defining the insertion hole,
   wherein the elastic part is elastically more deformable in an axial direction of the installation hole than a portion of the engine component on which the combustion pressure sensor is mounted and wherein the engine component is air tightly fixed to the engine at said axial abutment.

9. An assembly according to claim 8, wherein an annular seat surface is defined within said installation hole, the insertion part of the engine component has an annular contact surface, and the elastic part is a hollow metal ring having one axial surface in contiguous contact with the contact surface of the engine component and another axial surface in contiguous contact with the seat surface.

10. An assembly according to claim 8, wherein the installation hole is provided at an inside surface thereof with a seat surface and the elastic part is a thin thickness portion of the insertion part integrally formed therein and the thin thickness portion comes in pressurized contact with the seat surface.

11. An assembly according to claim 8, wherein the insertion part of the engine component has a contact surface and the elastic part is a protruding portion of the engine protruding radially in the installation hole and the protruding portion is provided with a seat surface which comes in pressurized contact with the contact surface.

12. An assembly according to claim 8, wherein the insertion part of the engine component is provided at an outer circumferential surface thereof with a male thread and the installation hole is provided at an inner circumferential surface thereof with a female thread, and, further, wherein the engine component is fastened to the engine by screwing the male thread into the female thread.

* * * * *